United States Patent [19]

Subramanian et al.

[11] 4,163,046
[45] Jul. 31, 1979

[54] RECOVERY OF SELENIUM

[75] Inventors: Kohur N. Subramanian; Alexander Illis, both of Mississauga; Norman C. Nissen, Oakville, all of Canada

[73] Assignee: The International Nickel Company, Inc., New York, N.Y.

[21] Appl. No.: 878,384

[22] Filed: Feb. 16, 1978

[30] Foreign Application Priority Data

May 24, 1977 [CA] Canada ................................. 279062

[51] Int. Cl.$^2$ ............................................. C01B 19/00
[52] U.S. Cl. ..................................... 423/510; 423/22; 423/41; 75/99
[58] Field of Search ............................... 423/508–516, 423/41, 22; 75/99

[56] References Cited
U.S. PATENT DOCUMENTS

| | | | |
|---|---|---|---|
| 2,084,394 | 6/1937 | Heberlein | 75/99 |
| 2,981,603 | 4/1961 | Towiner | 423/510 |
| 2,990,248 | 6/1961 | Vaaler | 423/509 |
| 3,127,244 | 3/1964 | Elkin et al. | 423/510 |
| 3,419,355 | 12/1968 | Van Stein | 423/510 |

OTHER PUBLICATIONS

Morrison, "Recovery & Separation of Selenium & Tellurium by Pressure Leaching of Copper Refinery Slime," Unit Processes in Hydrometallurgy, Met. Soc. Cnf. 24, pp.227-249 (1963.
Jennings et al., "A Hydrometallurgical Method of Recovering Selenium & Tellurium Iron Copper Refinery Slimes," Papers presented at AIME Annual Meeting of Feb. 25-29, 1968.

*Primary Examiner*—Earl C. Thomas
*Attorney, Agent, or Firm*—Ewan C. MacQueen; Miriam W. Leff

[57] ABSTRACT

A hydrometallurgical process for treating copper refinery anode slimes containing selenium, lead and precious metals in which a selenium product of better than 99.7% purity can be produced and the final residue is suitable for smelting to produce anodes for silver refining.

11 Claims, 1 Drawing Figure

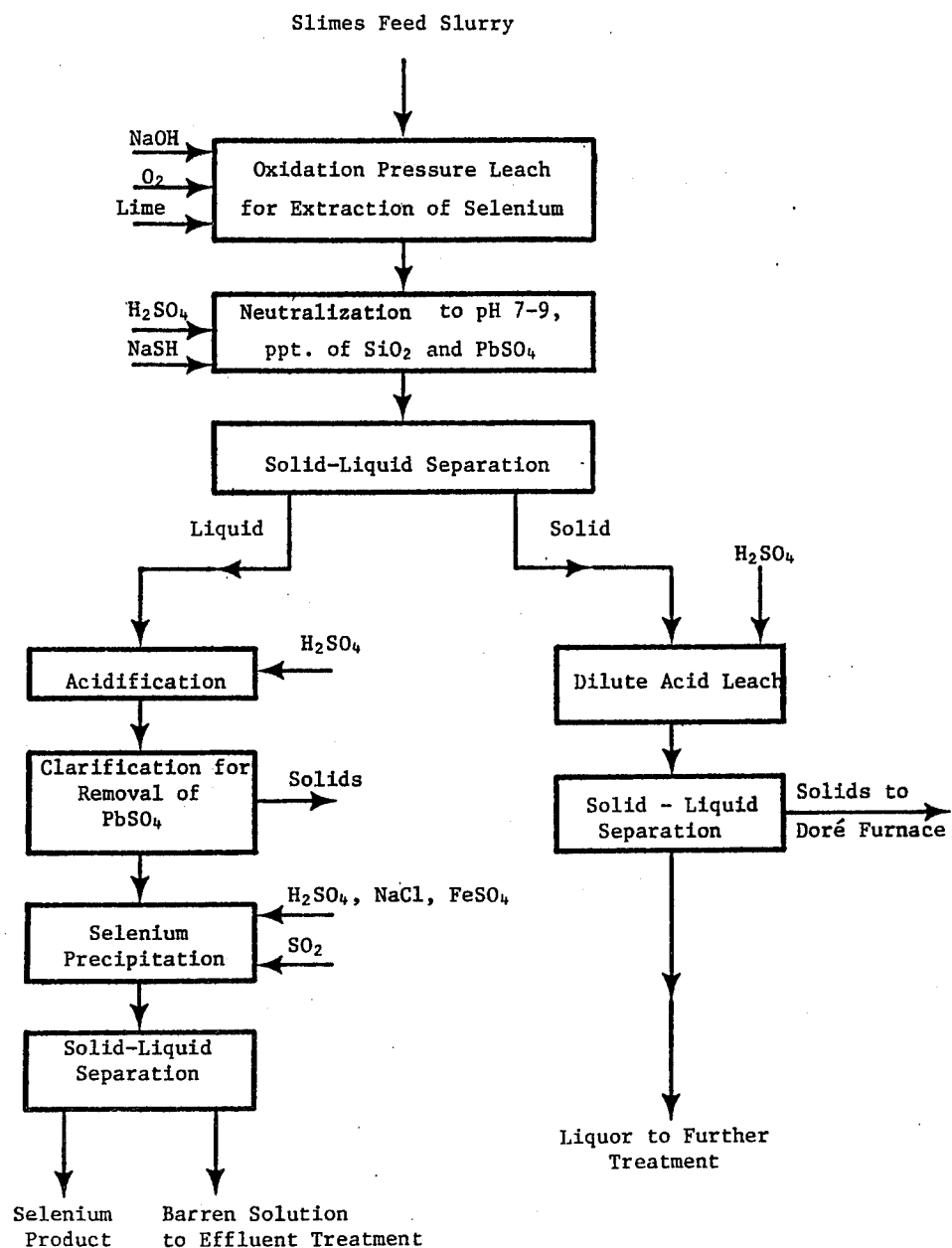

RECOVERY OF SELENIUM

This invention relates to a process for recovering selenium from anode slimes and acid plant sludges. More particularly, it concerns an oxidative pressure leaching process of recovering selenium and a precious metal concentrate from copper refinery anode slimes which contain, in addition to selenium and precious metals, base metals such as lead, copper and tellurium. The precious metals may include gold, silver and platinum group metals, particularly platinum and palladium.

BACKGROUND OF THE INVENTION

The present invention is described with particular reference to the treatment of anode slimes produced in the electrolytic refining of copper. Such slimes are a primary source of commercial selenium.

In the electrolytic refining of copper a relatively impure copper is made the anode in an electrolytic cell. As the anode corrodes, copper goes into solution and selenium, tellurium and other elements that do not dissolve in the electrolyte sink to the bottom of the cell and are collected as slimes. The slimes are treated for their valuable components. While copper anode slimes vary widely in composition, they generally contain significant amounts of copper, selenium, tellurium, lead, silver, gold and some platinum group metals. Typical compositions of copper refinery slimes are given on pages 34–35 of SELENIUM edited by Zingaro, R. A. and Cooper, W. C., Van Nostrand Reinhold Company (1974). Approximate ranges of selenium, tellurium, copper, nickel, lead, and precious metals are as follows:

| Approx. wt.% | Metal Values |
|---|---|
| 2.8 to 80 | copper |
| <1 to 45 | nickel |
| 0.6 to 21 | selenium |
| 0.1 to 13 | tellurium |
| <1 to 45 | silver |
| 0.3 to 33 | lead |
| up to 3 | golo |
| minor amounts | platinum group metals |

Gangue components such as $Al_2O_3$, $SiO_2$ and CaO are present in the amount of about 2 to 30%.

From the above it can be seen that a considerable amount of copper and tellurium may be present in the copper refinery slimes. The anode slimes may be pre-treated, i.e. before carrying out the steps of the present process for separating out copper and possibly tellurium. Methods for reducing the copper and/or tellurium levels are known. One method consists, for example, of treating the anode slimes with concentrated sulfuric acid at 150°–250° C. to convert copper and tellurium into water soluble compounds. Another consists of selectively extracting copper and tellurium by leaching in a dilute sulfuric acid medium under oxygen pressure. Ferric sulfate is employed in Japan for solubilizing copper.

Whether a pre-treatment step is employed depends on many factors, e.g., the composition of the anode slimes, the purity of the product desired, and the efficiency of a particular plant operation. For example, if the levels of copper and tellurium in the copper refinery slimes are very low and a decopperizing/detellurizing step may not be necessary. If physical separation of precipitates such as copper hydroxide formed during the process is efficient, the need for decopperizing the slimes is reduced. The present process has been carried out effectively for the production of highly pure selenium with as much as, for example, about 11% copper and 2.5% tellurium in the slimes. If a preliminary purification step is performed, the particular sulfation or other decopperizing and/or detellurizing method used is not critical with respect to the process described herein for the recovery of selenium.

In the present process described below, it is assumed that if a decopperizing and/or detellurizing step is carried out, it has already taken place.

A principal objective of the present process is to provide a process by which selenium is extracted and readily separated from anode slimes. A further objective is to recover selenium in elemental form as a commercial grade product. Another objective is to provice a precious metal feed, substantially free of selenium and tellurium for further processing in a Doré furnace prior to recovery of precious metals.

As will appear in more detail in the description below and in the accompanying drawing, the present process involves a caustic oxidative pressure leaching to extract selenium from the slimes in the hexavalent form.

In the description of the process herein, constituents levels are all given in weight percent, and the terminology preponderant or preponderant amount means more than 50%.

BRIEF DESCRIPTION OF DRAWING

The accompanying drawing is a flow diagram which illustrates an embodiment of the present invention as applied to copper refinery anode slimes which have been decopperized and detellurized.

THE INVENTION

In general, the present invention relates to the recovery of selenium from anode slimes, which as indicated previously may be pre-treated for copper and tellurium removal, comprising:
 (a) subjecting such slimes to a caustic oxidative leach to convert selenium values to hexavalent form;
 (b) neutralizing the product of the caustic leach with sulfuric acid to a pH of about 7 to 9 with subsequent separation of the leach residue from the neutralized caustic leach solution;
 (c) acidifying of the separated neutralized leach solution with sufficient sulfuric acid to provide an acidified solution containing about 100 to 200 grams per liter of sulfuric acid; and
 (d) clarifying the resultant acidified solution to obtain a further purified selenium-containing solution.

In accordance with one aspect of the present invention, it provides a process for the recovery of selenium from anode slimes containing selenium, tellurium, lead, copper, and precious metal values which comprises the successive steps of:
 (a) subjecting the anode slimes to a caustic oxidative pressure leach as an aqueous slurry having a solids content of about 10% to about 30% in the presence of an alkali metal hydroxide in excess over the amount stoichiometrically necessary for extracting all the selenium values, lime in the amount about 2% to about 10%, based on the weight of the anode slimes, and gaseous oxygen at an oxygen partial pressure of about 0.2 to about 1.5 MPa (about 30 to about 220 psi), at a temperature in the range of about 170° C. to about 220° C. for a period of about 3 to about 7 hours, to extract selenium in the hexavalent form;

(b) neutralizing the resultant product of the caustic leach with sulfuric acid to a pH of about 7 to about 9 and at a temperature in the range of about 30° C. to about 70° C. to precipitate lead values;

(c) adding an aqueous-soluble sulfide, e.g. in the amount equivalent to about 1% to about 7% by weight NaSH based on weight of the anode slimes, to precipitate precious metal values;

(d) separating the residue of neutralization-sulfide treatment from the neutralized selenium-containing leach solution;

(e) acidifying the separated neutralized selenium-containing leach solution further with sulfuric acid at a temperature of about 30° C. to about 60° C., said added sulfuric acid being sufficient to provide a resultant acidified solution containing about 100 to 200 grams per liter of sulfuric acid; and (f) clarifying the resultant acidified solution to obtain a further purified selenium-containing solution.

In accordance with another embodiment of the present invention, selenium is recovered from the further purified and clarified selenium-containing solution by treatment with sulfur dioxide at a temperature of about 90° C. to about 100° C. in the presence of a halide and ferrous ion, the sulfur dioxide being provided in at least a sufficient amount to maximize precipitation of selenium values as elemental selenium.

In the initial caustic leach step, which may be carried out as a single stage in the process, substantially all of selenium can be extracted from the slimes and substantially all of the tellurium can be separated in the residue. After neutralization of the caustic leach product and separation of the selenium-containing leach solution, the resultant residue may be treated for recovery of precious metals and/or tellurium.

In still another aspect of this invention the separated residue of the neutralized caustic leach step is repulped in sulfuric acid to a pH of about 1.5 to about 3.0 to dissolve copper and tellurium. A preponderant part of the copper and tellurium can be extracted by this means, the tellurium-bearing liquor can be reverted to a suitable stage in the refinery and the tellurium values recovered. The final residue, separated from the copper and tellurium-containing liquor, is rich in precious metals. It may, for example, be smelted to produce anodes for silver refinery.

DESCRIPTION OF A PREFERRED EMBODIMENT

As noted above, anode slimes differ widely in composition. In the embodiment described below it is assumed that the slimes, pre-treated for tellurium and copper removal, are separated from the tellurium-containing leach solution, e.g. by filtration, to provide detellurized-decopperized slimes.

A typical residue of copper refinery anode slimes subjected to an initial sulfation treatment contain about 10% to 50% selenium, about 3% to 30% lead, about 10% to 50% precious metals including silver, less than about 5% copper, and less than about 2% tellurium.

Referring to the drawing: Detellurized and decopperized slimes containing the following metal values, about 35% selenium, about 1% tellurium, about 3% copper, about 2% nickel, about 30% silver, about 0.5% gold, about 0.5% platinum, about 1.0% palladium and about 30% gangue including $SiO_2$, are slurried with one kilogram of caustic soda per kilogram of slimes to provide a pulp density of 15% by weight solids and with about 5% lime based on the weight of the slimes. The slimes are subjected to a caustic leach at about 180° to 220° C., e.g. 200° C., for about 3 to 7 hours, e.g. 5 hours, under 0.3 to 1.0 MPa, e.g. 0.7 MPa (100 psi) oxygen partial pressure. A temperature of at least about 180° C. is required for complete oxidation. Caustic soda is preferred because it is less expensive than other alkali metal hydroxides such as potassium or lithium hydroxide. The amount of alkali metal hydroxide required will vary according to the composition of the slimes treated. In general, the amount is calculated to be about 30% to 100% in excess of the reactions taking place. The oxygen can be provided, for example, by commercial oxygen at a total pressure of, e.g., 2.2 MPa. Air may be used. Oxidation of selenium to the hexavalent state is advantageous in that, for example, an essentially tellurium-free caustic solution can be obtained and there is no substantial loss of selenium with the lead precipitate as occurs when lead is removed from a solution containing mainly selenite. There is no requirement for controlling the oxidation of selenium to mainly $Se^{+4}$ since the problem of difficulty of reduction of $Se^{+6}$ to $Se°$ is taken care of in the present process, as explained below. The lime which is added to the caustic leach medium serves to aid subsequent filtration of the leach product slurry. The caustic oxidative leach treatment extracts in excess of 98% of the selenium and less than 5 milligrams per liter of tellurium into the leach liquor. When the caustic leach is carried out at a temperature of about 200° C., an $O_2$ partial pressure of about 0.7 MPa, a solids content of about 15%, it has been found that about 50% lead, 60% silica, about 2 to 10% of the platinum, and about 1 to 3% of the palladium are also extracted into the caustic leach liquor in about 4 hours. The reactions which occur during the various stages of the present process are very complex. Generally, it is believed that the overall reactions which occur during the caustic oxidative leach step are typified by the following equations:

$$2Se + 4NaOH + 3O_2 \rightarrow 2Na_2SeO_4 + 2H_2O \quad (A)$$

$$2Ag_2Se + 4NaOH + 3O_2 \rightarrow 4Ag + 2Na_2SeO_4 + 2H_2O \quad (B)$$

$$2Te + 4NaOH + 3O_2 \rightarrow 2Na_2TeO_4 + 2H_2O \quad (C)$$

$$2Cu + NaOH + O_2 + 2H_2O \rightarrow 2Cu(OH)_2 + NaOH \quad (D)$$

$$2Cu + NaOH + O_2 \rightarrow 2CuO + NaOH \quad (E)$$

$$PbSO_4 + 4NaOH \rightarrow Na_2PbO_2 + Na_2SO_4 + 2H_2O \quad (F)$$

$$SiO_2 + 2NaOH \rightarrow Na_2O \cdot SiO_2 + H_2O \quad (G)$$

$$C + 2NaOH + O_2 \rightarrow Na_2CO_3 + H_2O \quad (H)$$

In reaction (H) "C" represents organic compounds. The $Na_2TeO_4$ (reaction C) precipitates substantially quantitatively.

The caustic leach slurry is neutralized at a temperature of about 30° to 70° C., e.g. about 50° C., with sulfuric acid to a pH of between about 7 and about 9, e.g. about 7.5, and sodium hydrosulfide (NaSH) is added in the amount of about 1% to about 7% by weight of slimes. At a pH of about 7 to 9, lead values and silica precipitate. The extent of platinum and palladium precipitation varies, but the NaSH lowers the platinum and palladium levels in the purified liquor to about less than 5 milligrams each per liter. Instead of NaSH, a sulfide such as an alkali metal sulfide or alkaline earth metal sulfide or ammonium sulfide or a polysulfide may be used. The use of sulfide is particularly advantageous since it aids in the purification of the Se as well as in the separation and greater recovery of valuable precious metals including silver. Also, it will dispense with the requirement for the use of other means such as an expensive ion exchange step to recover precious metals, particularly to lower the precious metal levels in the selenium product. For example, in the absence of NaSH addition, the selenium product may analyze up to 500 ppm. platinum plus palladium and with a suitable amount of NaSH addition the platinum and palladium level may be decreased to as low as 5 ppm. The resultant product of the neutralized caustic leach is very complex. Consequently, for convenience the sulfide addition is expressed relative to the weight of the slimes. The amount of sulfide added is in effect a compromise to maximize the precipitation of precious metals from the neutralized caustic leach liquor without sacrificing the selenium purity or tellurium extraction during the subsequent acid leach.

With respect to reactions which occur in the neutralization step, it is believed that the overall reactions can be represented by the following equations:

$$2NaOH + H_2SO_4 \rightarrow Na_2SO_4 + 2H_2O \tag{I}$$

$$Na_2PbO_2 + 2H_2SO_4 \rightarrow PbSO_4 + Na_2SO_4 + 2H_2O \tag{J}$$

$$Na_2O \cdot SiO_2 + H_2SO_4 \rightarrow SiO_2 + Na_2SO_4 + H_2O \tag{K}$$

After neutralization with sulfuric acid, the resultant liquor is then separated from the residue, e.g. by filtration. As indicated above, filtration of the slurry is aided by the presence of the lime added to the caustic pressure leach slurry. A filtration rate of about 300 to 600 liters per square meter per hour, e.g. about 400, has been achieved when filtered under vacuum at about 75° C. The leach residue is then washed thoroughly to ensure that soluble selenium does not remain with and contaminate the tellurium, precious metals or other components of the tellurium-copper-precious metal recovery system.

The separated neutralized caustic leach liquor, containing about 2% of the lead, less than about 5 mg/l tellurium and less than about 70 mg/l copper, is further acidified with sulfuric acid directly to about 100 grams per liter acid at a temperature of about 50° to 60° C. Additional lead sulfate precipitates and the liquor is clarified to remove precipitated lead sulfate. It has been found that the clarified liquor should contain at least 100 g/l $H_2SO_4$ to achieve acceptable rates and conversion of the selenate to elemental selenium.

The acidified leach liquor contains selenium in solution substantially as sodium selenate ($Se^{+6}$) and minor amounts (if any) of sodium selenite ($Se^{+4}$). Reduction to elemental selenium is carried out with $SO_2$ in the presence of a halide and ferrous ion. Typically, halide is added, e.g. as a chloride in an amount equivalent to about 30 to about 70 grams per liter of sodium chloride, e.g. 50 grams per liter of NaCl, and about 5 to about 20 grams per liter of ferrous ion in the form of sulfate, e.g. about 10 grams per liter of ferrous ion in the form of ferrous sulfate, are added to the leach liquor, the mixture is heated to about 90° to 100° C. e.g. about 95° C., and $SO_2$ is fed to the heated mixture at the rate of about 0.1 to 0.3 liters per minute per liter of solution to precipitate elemental selenium. Almost 100% of the selenium values in solution precipitate in about 4 hours. The reactions which occur are typified by the following equations:

$$Na_2SeO_4 + 2HCl \rightarrow Na_2SeO_3 + H_2O + Cl_2 \tag{L}$$

$$H_2SeO_3 + 2SO_2 + H_2O \rightarrow Se + 2H_2SO_4 \tag{M}$$

$$3H_2SeO_4 + 6HCl + 6FeSO_4 \rightarrow 3H_2SeO_3 + 2FeCl_3 + 2Fe_2(SO_4)_3 + 3H_2O \tag{N}$$

$$H_2SeO_4 + 2HCl \rightarrow H_2SeO_3 + Cl_2 + H_2O \tag{O}$$

$$6FeSO_4 + 3Cl_2 \rightarrow 2FeCl_3 + 2Fe_2(SO_4)_3 \tag{P}$$

$$Fe_2(SO_4)_3 + SO_2 + 2H_2O \rightarrow 2FeSO_4 + 2H_2SO_4 \tag{Q}$$

$$2FeCl_3 + SO_2 + H_2SO_4 + 2H_2O \rightarrow 2FeSO_4 + 6HCl \tag{R}$$

In the reactions iron acts as a cyclic intermediate.

The elemental selenium is separated, e.g. by filtration, and the barren solution is neutralized to a pH of about 8 to 9 with lime. A selenium product can be produced having a purity of better than 99.7%.

The neutralized and sulfided caustic leach residue contains essentially all of the copper and tellurium in the feed to caustic pressure leaching. Preponderant parts of these elements are extracted by repulping the residue in sulfuric acid at a temperature of about 40° C. to about 70° C., e.g. about 50° C. and a pH of about 1.5 to 3.0, e.g., about 2.0. About 50% to 80% of the tellurium and copper values are extracted. This tellurium-bearing liquor is separated from the precious metals containing residue, and it may be treated elsewhere in the plant for Te recovery as currently practiced. This step, however, is not considered to be within the scope of this invention.

As shown in the flow diagram, the separated residue resulting from the neutralized oxidative caustic leach product and subjected to a dilute acid leach, and separated from the tellurium-bearing acid leach liquor, is fed to a Doré furnace for recovery of precious metals. With feeds of the composition used to illustrate the accompanying flow diagram, such residues analyze about 30% to 45% silver, about 1% to 2% copper, less than about 1% tellurium, e.g. about 0.5% or 0.6% tellurium, up to about 4% selenium, e.g. about 1% selenium, and about 5% nickel.

To enable those skilled in the art to understand the present invention more completely, the following illustrative examples are set forth.

EXAMPLE I 3.8 kg of decopperized-detellurized slimes (dry basis) analyzing with respect to Se, Te, Cu, and Ag: (%) 24.0 Se, 0.86 Te, 0.71 Cu, 22.7 Ag, contained entrained liquor which increased the copper and tellurium contents of the feed to 2.50 and 1.02 percent respectively. The feed was suspended in 18 liters of slurry containing 4 kg of caustic soda and 0.26 kg of hydrated lime. The slurry was leached at 200° C. for 5 hours under an oxygen partial pressure of 0.7 MPa (total pressure 2.2 MPa). At the end of 3 hours, selenium extraction was 98.6%.

The leach slurry was cooled and discharged into a vessel, where it was acidified to a pH of 7.5 using conc. $H_2SO_4$ at 50° C. Approximately 90 g of NaSH was added and the slurry agitated for an additional 60 minutes. The resultant purified selenium liquor contained 44.6 g/l Se, 0.67 Pt, 0.3 Pd and 64 mg/l copper. The liquor was subsequently acidified, clarified and then subjected to selenium precipitation. At this stage, 50 g/l NaCl and 10 g/l Fe as $FeSO_4$ were added and the liquor heated to 95° C. Sulfur dioxide was metered at 0.29 liters per minute per liter for about 4 hours. The selenium product contained 0.04% ash and 22 ppm (Pt+Pd) and 1.3 ppm silver.

Selenium products obtained on a laboratory and miniplant scale generally had the following impurity levels with or without the addition of NaSH at the appropriate stage.

|  | ppm |
| --- | --- |
| Copper | 1-6 |
| Nickel | 0.5-7 |
| Iron | 11-38 |
| Lead | <1-3 |
| Tellurium | <1-13 |
| Silver | >30 without NaSH addition |
|  | ~1 with NaSH addition |
| Platinum + | up to 500 without NaSH addition |
| Palladium | ~40 with 60g NaSH to the leads |
|  | ~20 with 90g NaSH to the leads |
|  | <5 with 120g NaSH to the leads |

The acidified caustic leach residue was acid leached at pH 2.0 and 60° C. for 1 hour. After filtration, the final residue, 2.75 kg, which analyzed (%) 0.45 Te, 0.46 Se, 0.48 Cu and 31.3 Ag, was suitable for precious metals recovery by smelting.

EXAMPLE II

A batch of caustic leach slurry after neutralization to pH 7.5 was found to analyze (mg/l) 1.7 Pt and 1.9 Pd, representing 0.67% and 0.25% of the values present in the feed. Addition of various amounts of NaSH to the slurry gave the following results.

| NaSH added | Solution Anal. (mg/l) | | |
| --- | --- | --- | --- |
| (% by wt. of slimes) | Pt | Pd | Te |
| 0 | 1.7 | 1.9 | 2.4 |
| 1.3 | 1.4 | 1.6 | 2.4 |
| 3.3 | 1.0 | 0.2 | 4.8 |
| 6.7 | 0.2 | 0.2 | 4.0 |

The addition of NaSH to the slurry at pH 7.5 does not solubilize tellurium to any significant extent, thus minimizing contamination of the selenium product.

Another test where 3.4% NaSH by weight of slimes was added produced a liquor containing less than 0.1 mg/l each of Pt and Pd.

Another batch of caustic leach slurry after neutralization to pH 7.5 was found to analyze (mg/l) 6.9 Pt and 3.6 Pd, representing 1.86% and 0.35% extractions respectively. Addition of various amounts of sodium sulfide gave the following results:

| $Na_2S$ added | Solution Anal. (mg/l) | |
| --- | --- | --- |
| (% by wt. of slimes) | Pt | Pd |
| 0 | 6.9 | 3.6 |
| 0.6 | 3.5 | 0.45 |
| 1.2 | 2.3 | 0.38 |
| 3.0 | 1.5 | 0.36 |

Examples I and II demonstrate that the addition of sulfide to the neutralized slurry is an effective way of lowering the quantities of precious metals that are otherwise lost to the selenium product.

EXAMPLE III

As shown in the accompanying flow sheet, in accordance with the present process the caustic leach liquor is purified in two stages prior to selenium recovery by $SO_2$ reduction. The neutralization step removes the majority of the lead and silica, however, nearly 2% of the lead and small amounts of silica precipitate out of solution during further acidification. A separation of this precipitate is carried out to reduce contamination of the final product.

In a test in which 920 grams of Se was recovered by $SO_2$ reduction, approximately 4.8 grams of precipitate had been separated from the 100 grams per liter acid solution. The presence of this would have caused an increase in impurity content of about 0.5% in the selenium product.

EXAMPLE IV

A selenate-containing leach liquor obtained by caustic oxidative pressure leach of decopperized-detellurized copper refinery anode slimes followed by neutralization in accordance with the present invention, was divided into three samples, to which was added NaCl, $FeSO_4$ and $H_2SO_4$. The amount of $H_2SO_4$ was adjusted to provide 50, 100 and 150 grams per liter, respectively, in each sample. Thereafter, $SO_2$ was bubbled into each sample for about 3 hours and the solution was analyzed for selenium. The following rates of $Se^{6+}$ reduction were obtained as a function of initial acid concentration:

| Conditions: | Initial Se Conc: 35 g/l | |
| --- | --- | --- |
| | Catalysts: 50 g/l NaCl | |
| | 10 g/l $Fe^{2+}$ | |
| | $SO_2$: 165 ml/min/1 of solution | |
| | Temp: 95° C. | |
| Results: | Initial Acid | Se Reduction Rate |
| | (g/l) | g/l/h |
| | 50 | 3.3 |
| | 100 | 10.4 |
| | 150 | 14.8 |

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A process for recovery of selenium from anode slimes containing selenium comprising:
   (a) subjecting such slimes to a caustic oxidative leach to convert selenium values to the hexavalent form;
   (b) neutralizing the product of the caustic leach with sulfuric acid to a pH of about 7 to about 9 with subsequent separation of the leach residue from the neutralized caustic leach solution;
   (c) acidifying the separated neutralized leach solution with sufficient sulfuric acid to provide an acidified solution containing about 100 to about 200 grams per liter of sulfuric acid, and
   (d) clarifying the resultant solution to obtain a further purified selenium-containing solution.

2. A process for recovery of selenium from anode slimes containing selenium, tellurium, lead, copper and precious metal values, including silver, which comprises the successive steps of:
   (a) subjecting the anode slimes to a caustic oxidative pressure leach as an aqueous slurry having a solids content of about 10% to about 30% in the presence of an alkali metal hydroxide in excess over the amount stoichiometrically necessary for extracting all the selenium values, lime in the amount about 2% to about 10% based on the weight of the anode slimes, and gaseous oxygen at an oxygen partial pressure of about 0.2 to about 1.5 MPa, at a temperature in the range of about 170° C. to about 220° C. for a period of about 3 to about 7 hours, to extract selenium in the hexavalent form;
   (b) neutralizing the resultant product of the caustic leach with sulfuric acid to a pH of about 7 to about 9 and at a temperature of about 30° C. to about 70° C. to precipitate lead values;
   (c) adding an aqueous-soluble sulfide to precipitate precious metal values;
   (d) separating the residue of neutralization-sulfide treatment from the neutralized selenium-containing leach solution;
   (e) acidifying the separated neutralized selenium-containing leach solution further with sulfuric acid at a temperature of about 30° C. to about 60° C., said added sulfuric acid being sufficient to provide a resultant acidified solution containing about 100 to 200 grams per liter of sulfuric acid; and
   (f) clarifying the resultant acidified solution to obtain a further purified selenium-containing solution.

3. A process according to claim 2 wherein the further purified selenium-containing solution is treated with sulfur dioxide at a temperature of about 90° C. to about 100° C. in the presence of a halide and ferrous ion, the sulfur dioxide being provided in at least a sufficient amount to maximize precipitation of the selenium values present in solution as elemental selenium.

4. A process according to claim 2 wherein the gaseous oxygen provided in the caustic oxidation pressure leach is commercial grade oxygen.

5. A process according to claim 2 wherein the sulfide provided in the neutralization step is NaSH in the amount of about 1% to about 7% based on the weight of the slimes.

6. A process according to claim 3 wherein the alkali metal halide is sodium chloride, and the sodium chloride is provided in the amount of about 30 to about 70 grams per liter and the ferrous ion is provided as ferrous sulfate and in the amount of about 5 to about 20 grams per liter ferrous ion.

7. A process according to claim 2 wherein the anode slimes are pretreated for decopperization and/or detellurization.

8. In a process for the recovery of selenium or selenium from anode slimes containing selenium, tellurium, lead and precious metals, including silver, platinum and palladium values and containing silica, wherein the anode slimes are pre-treated for decopperization and/or the improvement comprising the steps of:
   (a) subjecting said pre-treated anode slimes to a caustic oxidative pressure leach as an aqueous slurry having a solids content of about 10% to about 30% in the presence of an alkali metal hydroxide in excess over the amount stoichiometrically necessary for extracting all the selenium values, lime in the amount about 2% to about 10%, based on the weight of the anode slimes, and gaseous oxygen at an oxygen partial pressure of about 0.2 to about 1.5 MPa, at a temperature in the range of about 170° C. to about 220° C. for a period of about 3 to about 7 hours, to extract substantially all of the selenium and to precipitate substantially all of the tellurium;
   (b) neutralizing the resultant product of the caustic leach with sulfuric acid to a pH of about 7 to about 9 and at a temperature of about 30° C. to about 70° C. to precipitate a preponderant part of the lead and silica;
   (c) adding an aqueous-soluble sulfide to precipitate a major part of the palladium and platinum in the liquor;
   (d) separating the product of neutralization into a selenium-containing leach solution and a tellurium-containing residue;
   (e) acidifying the separated neutralized selenium-containing leach solution further with sulfuric acid at a temperature of about 30° C. to about 60° C., said added sulfuric acid being sufficient to provide a resultant acidified solution containing about 100 to 200 grams per liter of sulfuric acid; and
   (f) clarifying the resultant acidified solution to obtain a further purified selenium-containing solution;
   (g) treating the further purified selenium-containing solution with sulfur dioxide at a temperature of about 90° C. to about 100° C. in the presence of sodium chloride in the amount of above 30 to about 70 grams per liter and ferrous sulfate in the amount of about 5 to about 20 grams per liter ferrous ion, the sulfuric dioxide being provided in at least sufficient amount to maximize precipitation of selenium values present in solution as elemental selenium.

9. A process according to claim 8 wherein the tellurium-containing residue separated from the neutralized caustic leach solution is repulped in sulfuric acid at a temperature of about 40° C. to about 70° C. and a pH of about 1.5 to about 3.0 to extract a liquor-containing preponderant part of said copper and tellurium values, and the resultant residue separated from the copper and tellurium-containing liquor is smelted to produce anodes for silver refining.

10. A process according to claim 9 wherein the product of neutralization is filtered under vacuum at the rate of at least about 300 to 600 liters per square meter per gram the separation neutralized leach solution contains less than 5 milligrams per liter tellurium and less than 50 milligrams per liter copper, and the acidified reduced selenium, separated from solution has a purity greater than about 99.7%.

11. A process for the recovery of selenium from anode slimes containing selenium and tellurium comprising:
   (a) subjecting such slimes to a caustic oxidation leach to convert selenium and tellurium values to hexavalent form;
   (b) neutralizing the product of the caustic leach with sulfuric acid to a pH of about 7 to about 9 with subsequent separation of the leach residue from the neutralized caustic leach solution;
   (c) acidifying the separated neutralized leach solution with sufficient sulfuric acid to provide an acidified solution containing about 100 to about 200 grams per liter of sulfuric acid, and
   (d) clarifying the resultant solution to obtain a further purified selenium-containing solution.

* * * * *